United States Patent
Jude et al.

(10) Patent No.: US 8,081,197 B1
(45) Date of Patent: Dec. 20, 2011

(54) SYSTEM AND METHOD FOR ANGULAR IMAGE SELECTION

(75) Inventors: Maria Eugene Jude, Bangalore (IN);
Anant Gilra, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 531 days.

(21) Appl. No.: 12/327,646

(22) Filed: Dec. 3, 2008

(51) Int. Cl.
G09G 5/00 (2006.01)

(52) U.S. Cl. ........................................................ 345/628
(58) Field of Classification Search .................... 345/628
See application file for complete search history.

(56) References Cited

U.S. PATENT DOCUMENTS

| | | | | |
|---|---|---|---|---|
| 5,384,907 | A * | 1/1995 | Arimatsu | 715/236 |
| 5,715,412 | A * | 2/1998 | Aritsuka et al. | 715/729 |
| 6,052,486 | A * | 4/2000 | Knowlton et al. | 382/232 |
| 6,172,682 | B1 * | 1/2001 | Claiborne et al. | 345/441 |
| 6,389,155 | B2 * | 5/2002 | Funayama et al. | 382/118 |
| 6,556,721 | B1 | 4/2003 | Wang et al. | |
| 6,587,596 | B1 | 7/2003 | Haeberli | |
| 7,262,781 | B2 * | 8/2007 | Balinsky et al. | 345/620 |
| 7,679,625 | B1 * | 3/2010 | Fagans et al. | 345/650 |
| 2005/0276477 | A1 | 12/2005 | Lin et al. | |
| 2008/0007788 | A1 | 1/2008 | Good et al. | |

* cited by examiner

Primary Examiner — Ryan R Yang
(74) Attorney, Agent, or Firm — Robert C. Kowert; Meyertons, Hood, Kivlin, Kowert & Goetzel, P.C.

(57) ABSTRACT

Various embodiments of a system and method for angular image selection are described. Embodiments may include a graphics application that may receive input indicating a first displacement of a control from a first location of an image to a second location of the image. The angle of the first displacement may be non-zero with respect to horizontal and vertical axes of the display. The graphics application may receive input indicating a second displacement (perpendicular to the first displacement) of the control from the second location to a third location of the image. The graphics application may generate a rectangular selection area on the image such that two sides of the rectangular selection area are parallel to the first displacement and two other sides of the rectangular selection area are parallel to the second displacement. The graphics application may perform an image editing function on the selected portion of the image.

37 Claims, 13 Drawing Sheets

SYSTEM AND METHOD FOR ANGULAR IMAGE SELECTION

BACKGROUND

1. Field of the Invention

The present invention is directed to computer systems. More particularly, it is directed to selecting portions of electronic images of a display within a computing environment.

2. Description of the Related Art

Various computer applications, such as graphics editing applications, can perform editing functions on digital images. Typically, such graphics editing applications provide a graphical user interface for manipulating digital images through various tools. For instance, a photographer might utilize a graphics editing application to adjust the brightness or contrast of a digital photograph. In another example, a web designer might utilize a graphics editing application to generate images for a web-based application. In some cases, a user of a graphics editing application may wish to edit only a part of a digital image. In these cases, the user may select a portion of the digital image on which to perform an editing function. For instance, the aforementioned graphical user interface may include one or more tools for selecting portions of an image. Typically, such tools may be responsive to user input, such as a user's movement of a pointing device (e.g., a mouse or other input device). In some cases, the graphics editing application may enable a user to perform one or more modifications to a selected portion of a digital image. For instance, instead of adjusting the brightness and contrast of an entire digital image, a photographer might utilize a graphics editing application to adjust the brightness and contrast of only a portion of the digital image.

SUMMARY

Various embodiments of a system and method for angular image selection are described. The system and method for angular image selection may include an angular selection component configured to receive input indicating a first displacement of a control from a first location of an image displayed on a display to a second location of the image. For instance, the angular selection component may be configured to receive input that indicates an interface control (e.g., a pointing control, such as a cursor) has moved from the first location to the second location. Additionally, the angle of the first displacement may be non-zero with respect to the horizontal and vertical axes of the display.

The angular selection component may also be configured to receive input indicating a second displacement of the control from the second location of the image to a third location of the image; such second displacement may be perpendicular to the first displacement. In some embodiments, the angular selection component may be configured to generate a rectangular selection area on the image such that two sides of the rectangular selection area are parallel to the first displacement and two other sides of the rectangular selection area are parallel to the second displacement.

The angular selection component may also be configured to perform an image editing function on the portion of the image selected by the rectangular selection area. In one embodiment, such function may include a cropping function that may generate a cropped image by removing the portion of the image that is not selected by the rectangular selection area. In various embodiments, the angular selection component may be configured to automatically rotate the cropped image to generate a rotated cropped image. Two sides of the rotated cropped image may be parallel to the horizontal axis of the display, and the two other sides of the rotated cropped image may be parallel to the vertical axis of the display. In various embodiments, the angular selection component may be configured to generate the rectangular selection area according to a particular size that is dependent upon the length of the first displacement and the length of the second displacement.

Figure 1A:
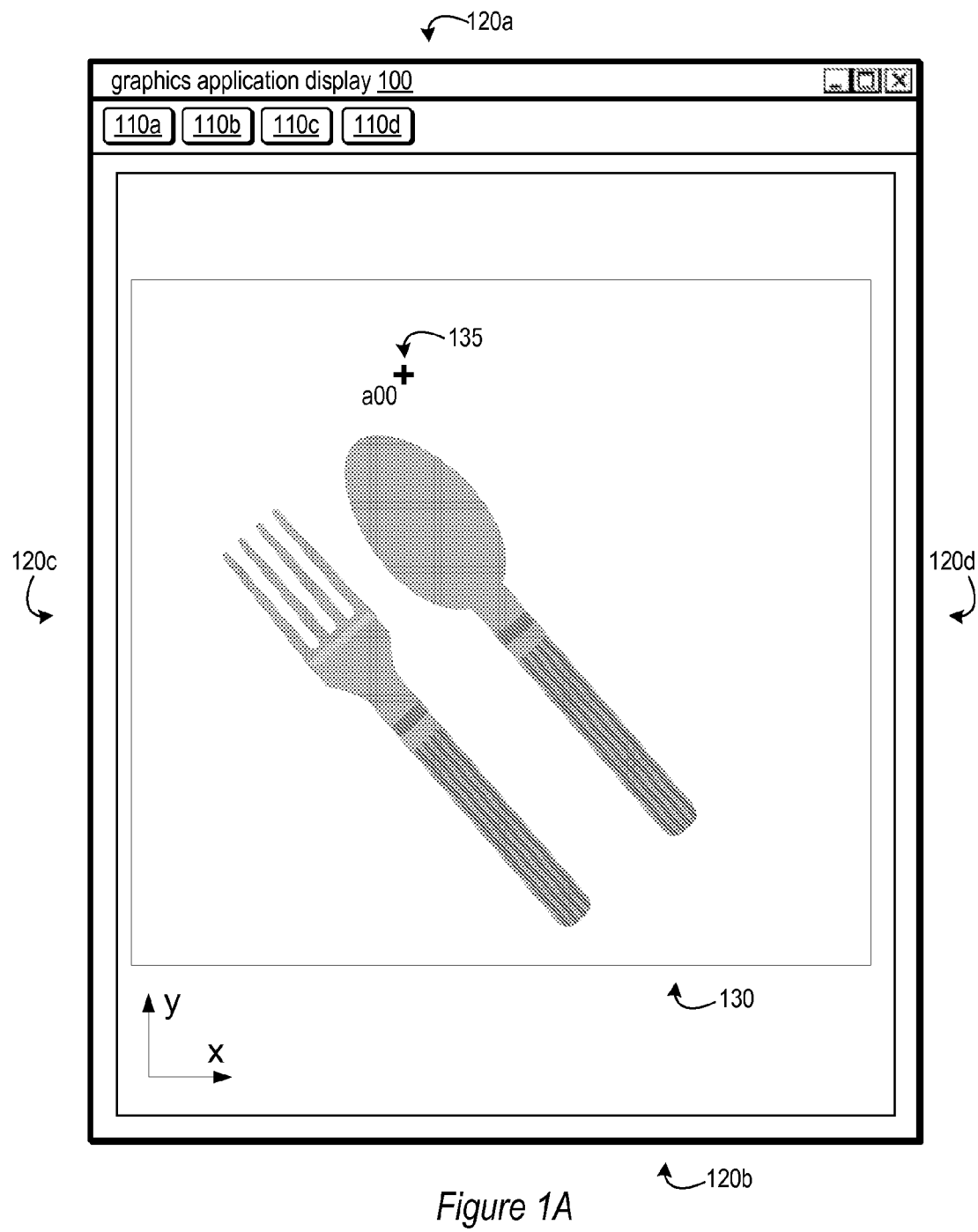
FIGS. 1A-F illustrate various example displays that may be generated by an angular selection component and/or graphics application, according to various embodiments.

While the system and method for angular image selection is described herein by way of example for several embodiments and illustrative drawings, those skilled in the art will recognize that the system and method for angular image selection is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for angular image selection as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction

Various embodiments of a method and system for angular image selection are described. The system and method for angular image selection may include an angular selection component configured to provide various image editing functions for modifying digital images. Digital images may include vector graphics, such as scalable vector graphics (SVG), as well as raster graphics, such as bitmap (BMP) images. In various embodiments, the angular selection component may be configured to receive input specifying the selection of a particular portion of an image. The angular selection component may also be configured to perform a function upon the selected portion of the image. In one embodiment, such function may be a cropping function configured to generate a cropped image by removing the unselected portions of an image. In other embodiments, such functions may include other image editing functions such as adjusting contrast, adjusting brightness, adjusting saturation, adjusting hue, adjusting sharpness, blurring (e.g., a Gaussian blur), adjusting gamma, embossing, adjusting color or grayscale levels, auto leveling, smoothing, color shifting, despeckling, adjusting white balance, applying transformations (e.g., scaling, rotation, skewing, warping, etc.), and/or various other image editing functions.

In conventional systems, generating a rectangular selection area (which may also be referred to as a "rectangular marquee selection") on an image of a display typically includes generating a rectangular selection area that is aligned with both the horizontal axis (also referred to herein as the x-axis) of the display and the vertical axis (also referred to herein as the y-axis) of the display. In other words, the horizontal sides of the conventional rectangular selection area are parallel to the x-axis of the display whereas the vertical sides of the conventional rectangular selection area are parallel to the y-axis of the display. Since digital images may in many cases include objects (e.g., objects portrayed by the image) that are oriented in a variety of ways (e.g., objects oriented diagonally across the display), such images may in many cases need to be rotated (e.g., rotated to align an object with the vertical or horizontal axis of the display) before a conventional rectangular selection area may be utilized to properly select an object of the image. In such conventional systems, determining the particular angle that an image should be rotated may be a guess-and-check procedure. For instance, the user may repeatedly try a sequence of different rotation angles until a given angle results in the correct orientation of an object that is selected (e.g., until the object is aligned with at least one of the x-axis and the y-axis of the display).

As described in more detail below, the angular selection component described herein may enable a user to generate (via the angular selection component) a rectangular selection area on an image without such guess-and-check procedures and without having to rotate the image prior to such selection. Furthermore, the angular selection component may (in response to various input) generate such rectangular selection area such that the rectangular selection area is oriented at a non-zero angle with respect to both the horizontal and vertical axes of the display. In various embodiments, such an angular-oriented rectangular selection area may be utilized to select a portion of an image, such as a portion containing an object that is oriented at a non-zero angle with respect to both the horizontal and vertical axis of the display.

Image Selection

FIGS. 1A-1F illustrate a series of example displays of a graphics application in which various embodiments may be implemented; such displays illustrate an angular selection according to various embodiments. Graphics application display 100 may be a display (e.g., a display generated on a monitor or similar device) of any application configured to view and/or modify digital images. Examples of types of applications in which embodiments may be implemented may include, but are not limited to, scientific, medical, design (e.g., CAD systems), painting, publishing, digital photography, video editing, games, animation, and/or other applications in which digital image generation, rendering and/or processing may be performed. Specific examples of applications in which embodiments may be implemented include, but are not limited to, Adobe® Fireworks® and Adobe® Photoshop®. Various embodiments of the angular selection component as described herein may be implemented as or in a tool, module, library function, plug-in, application extension, stand-alone application, etc.

The graphics application and/or the angular selection component described herein may also be responsive to one or more controls, such as controls 110*a-d*, collectively referred to as controls 110 (while four controls are illustrated, any number of controls may be present in various embodiments). Controls 110 may include various user interface elements such as icons, buttons, menus, or other controls that represent various functionalities of the graphics application, such as adjusting brightness, adjusting color, adjusting contrast, and/or any of the other image-editing functions described above.

FIG. 1 also illustrates a horizontal axis (i.e., the illustrated x-axis) as well as a vertical axis (i.e., the illustrated y-axis). In some embodiments, such axes are a visible portion of graphics application display 100. In other embodiments, such axes are hidden from view. In various embodiments, since the boundary 120 of graphics application display 100 may in many embodiments be rectangular, the horizontal axis of the display may be parallel to the horizontal portions of the display boundary (e.g., items 120*a-b*). Likewise, the vertical axis of the display may be parallel to the vertical portions of the display boundary (e.g., items 120*c-d*).

Image 130 is one example of an image that may be viewed, edited, or otherwise processed by the graphics application and/or the angular selection component described herein. While the example image illustrates dining utensils (e.g., a fork and a spoon), any other image may be utilized in other embodiments. Furthermore, such image may include raster graphics, scalable vector graphics, or some other type of graphic, whether such type of graphic is presently known or developed in the future. Furthermore, since many types of video or motion pictures include a sequence of still images or frames, various embodiments may include extending the techniques described herein with respect to individual images to videos including such a sequence of still images or frames.

In addition to controls 110, the angular selection component described herein may be responsive to input from one or more controls for specifying a location of image 130. Control 135 may be moved to various locations of display 100, including various locations or points on image 130, in response to input. One type of input includes input provided by a pointing device (e.g., a computer mouse, trackball, track pad, stylus, touch screen, etc.). In various embodiments, the location of control 135 may indicate a particular location of display 100 (including locations of image 130); such location may be utilized by the graphics application and/or the angular selection component described herein. Various other input components (e.g., one or more keystrokes or mouse clicks) may be used to specify a location of the image 130. For instance, control 135 may be moved to a particular location of image 130 via a pointing device, and another input component may be activated (e.g., a keystroke, mouse click, or similar input) to confirm that the location at which the cursor resides should be inputted into the graphics application and/or the angular selection component described herein.

The angular selection component described herein may (in response to various input) generate a rectangular selection area that is oriented at a non-zero angle with respect to both the horizontal and vertical axes of the display. In various embodiments, the orientation of the rectangular selection area (with respect to the display axes) may be measured from any side of the rectangular selection area and/or any segment parallel to a side of the rectangular selection area (e.g., a perpendicular bisector of the rectangular selection area). The process of creating a rectangular selection area (e.g., a selection marquee) is described in more detail below.

Figure 1B:
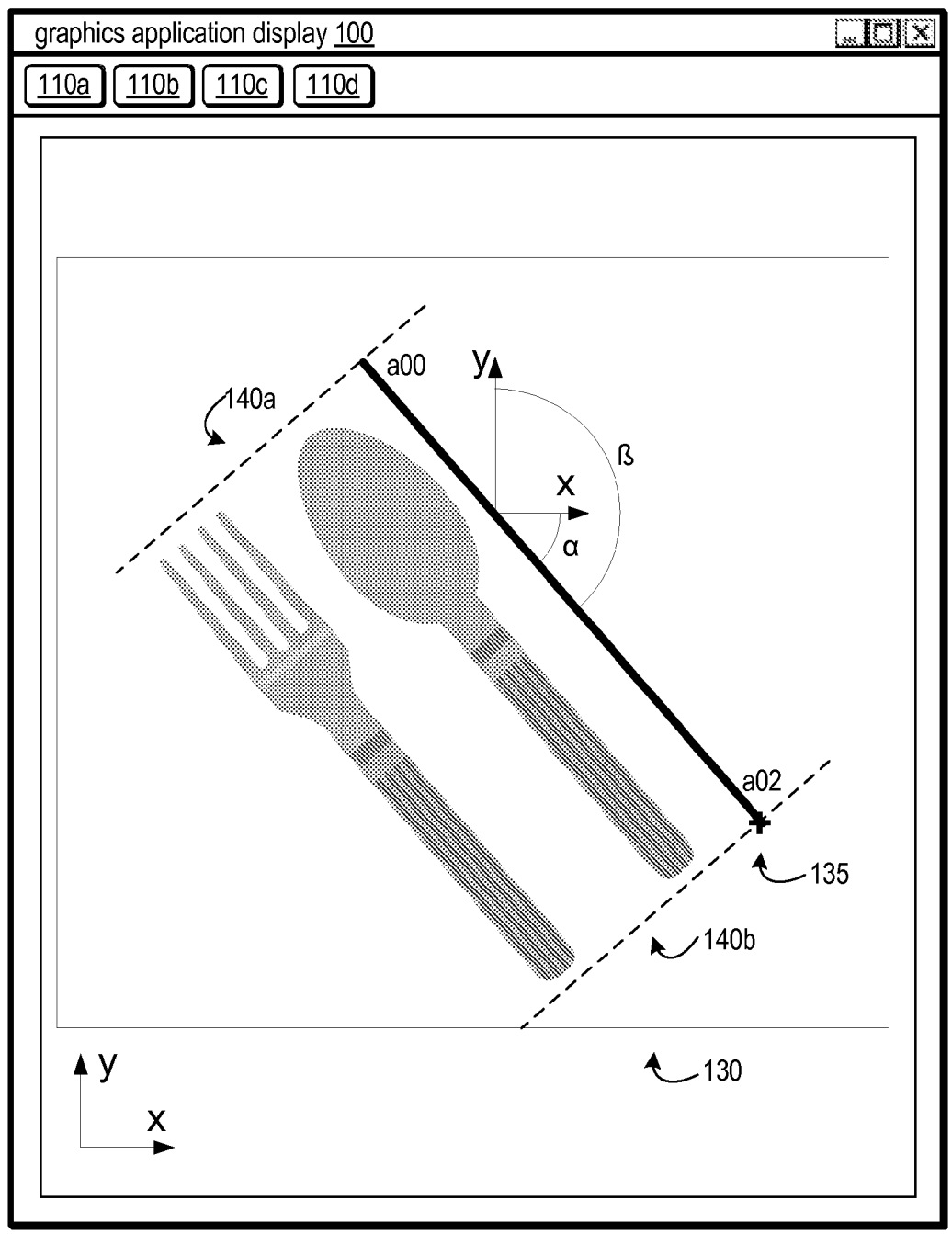

In various embodiments, the angular selection component may receive input (e.g., user input) indicating a displacement of a control from a first location of an image displayed on a display to a second location of the image. For instance, the graphics application may be configured to receive input that indicates control 135 has moved (e.g., in response to user or other input) from the first location to the second location. The angle of the first displacement may be non-zero with respect to the horizontal and vertical axes of the display. FIG. 1A illustrates the selection of such first location (illustrated as location a00) via control 135. FIG. 1B illustrates the movement of control 135 from location a00 to location a02; location a02 may represent the aforesaid second location. The aforesaid displacement of the control is illustrated by the straight line between points a00 and a02. Note that in various embodiments, the movement of control 135 may, but is not necessarily required to, travel along the straight line between location a00 and location a02. For instance, in some embodiments, control 135 may travel (e.g., in response to user or other input) to various locations not present on the line between location a00 and a02 prior to arriving at location a02. Accordingly, in various embodiments, the displacement of the control and the movement of the control may not entirely coincide. Furthermore, angle α illustrates the angle of the displacement with respect to the horizontal axis of the display. As illustrated, angle α is a non-zero angle. Accordingly, the displacement of the control at point a02 with respect to point a00 is not parallel to the horizontal axis of the display. Additionally, angle β illustrates the angle of the displacement with respect to the vertical axis of the display. As illustrated, angle β is a non-zero angle. Accordingly, the displacement of the control at point a02 with respect to point a00 is not parallel to the vertical axis of the display.

As illustrated in FIG. 1B, the angular selection component may be configured to generate guidelines 140*a* and 140*b* (collectively referred to as guidelines 140), each of which are perpendicular to the displacement of location a02 with respect to location a00. In various embodiments, such guidelines may be present while control 135 is moved to select location a02 as described above. In this way, guidelines 140 may assist a user with selecting a first displacement that will result in a selection area that properly covers the portion of the image to be selected. In the illustrated example, the user (or other entity operating control 135) may attempt to select the portion of the image that includes the illustrated spoon. Guidelines 140 may be adjusted at runtime as control 135 is moved about display 100. For instance, since the illustrated displacement may change in real time until the selection of point a02 is finalized, the angular selection component may adjust guidelines in real time such that each guideline intersects an endpoint of the displacement and remains perpendicular to the endpoint. In the illustrated example, the guidelines may assist the user (or other entity operating control 135) in selecting a displacement that will result in a rectangular selection area that wholly includes the spoon. For instance, in some embodiments, if the guidelines intersect a portion of the illustrated spoon, a portion of the spoon will not be included within the rectangular selection area that is to be generated.

Figure 1C:
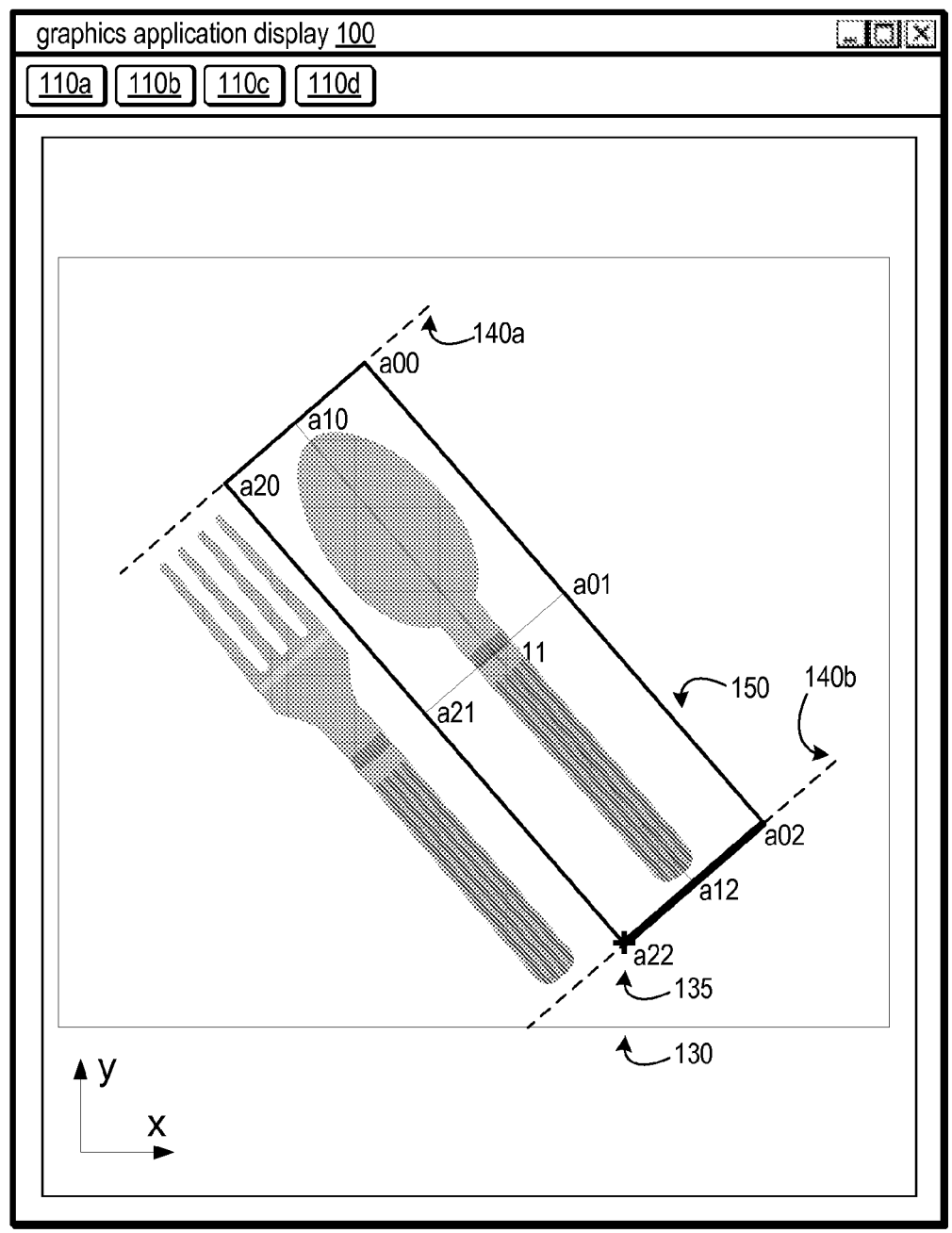

The angular selection component may also be configured to receive input indicating a second displacement of the control from the second location of the image (e.g., a02) to a third location of the image (e.g., a22); such second displacement may be perpendicular to the first displacement (displacement of a02 with respect to a00). In various embodiments, this second displacement may (in conjunction with the first displacement from a00 to a02) define the size of the rectangular selection area. FIG. 1C illustrates one example of such a displacement. For instance, the movement of control 135 from a02 to a22 may define the second displacement. In various embodiments, the angular selection component may receive input (e.g., keystroke(s), mouse click(s), or other input) that indicates confirmation of a22 as the third location selected. In various embodiments, the angular selection component may generate rectangular selection area 150, which is comprised of the line segments a00-a02, a02-a22, a22-a20, and a20-a00. In various embodiments, the graphics application may be configured to generate a rectangular selection area on the image such that two sides of the rectangular selection area (e.g., side a00-a02 and side a20-a22) are parallel to the first displacement and two other sides of the rectangular selection area (e.g., side a20-a00 and side a22-a02) are parallel to the second displacement. In the illustrated embodiment, the area of the rectangular selection area may be equivalent to the product of the first displacement (e.g., displacement of a02 with respect to a00) and the second displacement (e.g., displacement of a22 with respect to a02). However, as described with respect to FIGS. 2-4, other areas or sizes of rectangular selection areas may be generated based on the first displacement and the second displacement.

In some embodiments, the rectangular selection area may include guides to facilitate the selection of an object and/or the correct orientation of the selection area. As illustrated in FIG. 1C, two guides are illustrated as perpendicular bisectors of rectangular selection area 150. More specifically, one of such guides is illustrated as the line segment between locations a10 and a12. The other one of such guides is illustrated as the line segment between locations a21 and a01. In the illustrated embodiment, the intersection of such guides is the center of rectangular selection area 150, which is denoted by location a11 of FIG. 1C.

Since in various embodiments the selection area to be generated is to be rectangular and since adjacent sides of a rectangle are perpendicular to one another, the angular selection component may force the second displacement (e.g., displacement of a22 with respect to a02) to be perpendicular to the first displacement (e.g., displacement of a02 with respect to a00). For instance, the angular selection component may force such perpendicularity to ensure that a user or other entity does not select a non-rectangular selection area. In some embodiments, when location a22 is to be selected, the angular selection component may (irrespective of the locations to which the control 135 is moved) require that a22 be a point selected from the set of points on guideline 140b. For instance, in the illustrated embodiment, location a22 is a point on guideline 140b.

As illustrated by FIG. 1, the angular selection component described herein may enable the selection of an image object oriented at a non-zero angle with respect to the axes of the application display without requiring rotation of the image before selecting the object with the rectangular selection area (or a rectangular "marquee selection" or "bounding box"). As described above, the angular selection component may enable a user or other entity to provide input (e.g., via pointing device or text input device) and the angular selection component may generate a rectangular selection area that is oriented at a non-zero angle (e.g., an angle matching an object to be selected) with respect to the horizontal and vertical axis of the display.

The graphics application may also be configured to perform an image editing function on the portion of the image selected by the rectangular selection area 150. For instance, functions that may be performed on the portion of the image selected by the rectangular selection area may include cropping, adjusting contrast, adjusting brightness, adjusting saturation, adjusting hue, adjusting sharpness, blurring, adjusting gamma, embossing, adjusting color or grayscale levels, auto leveling, smoothing, color shifting, despeckling, adjusting white balance, and/or various other image editing functions.

Figure 1D:
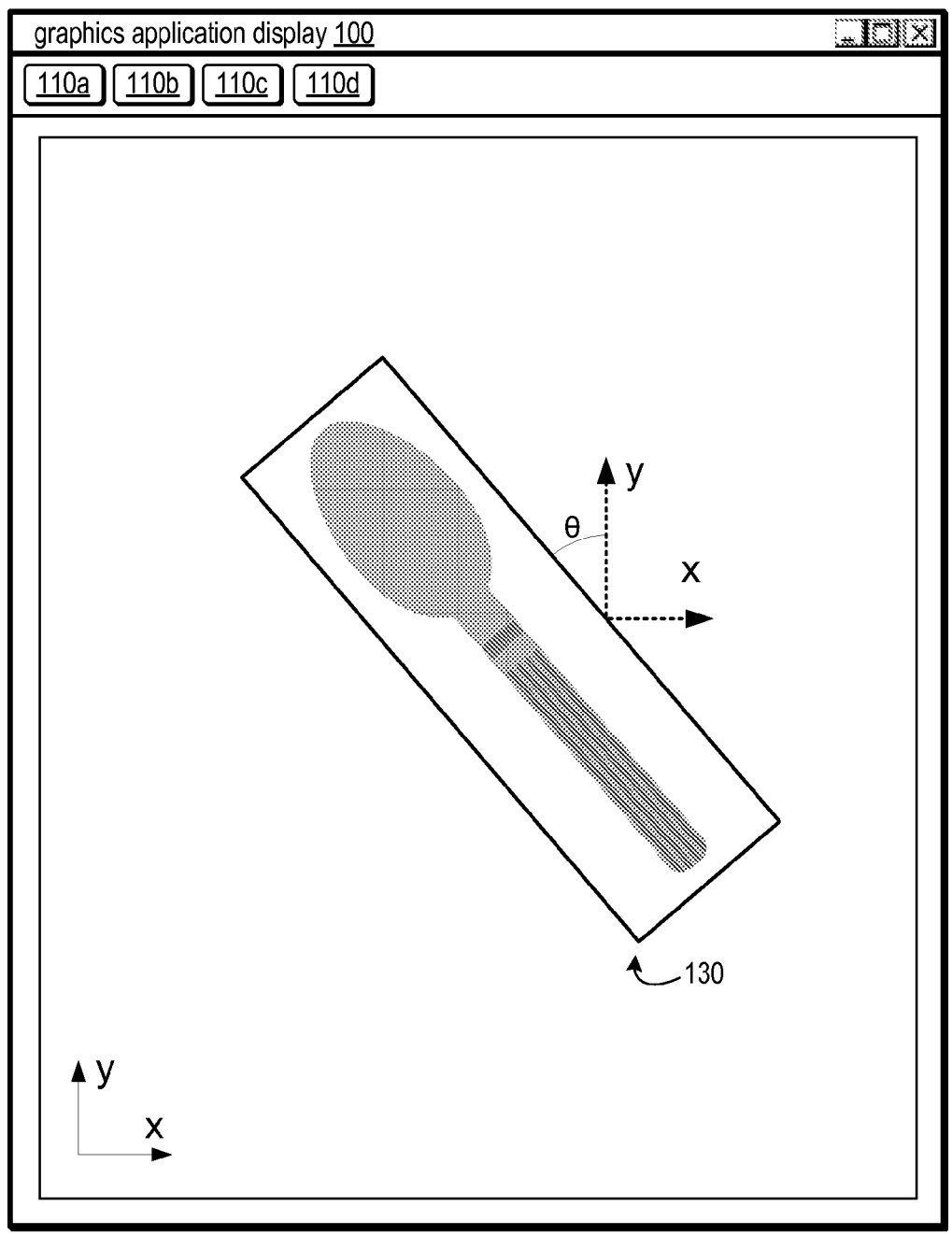
Figure 1E:
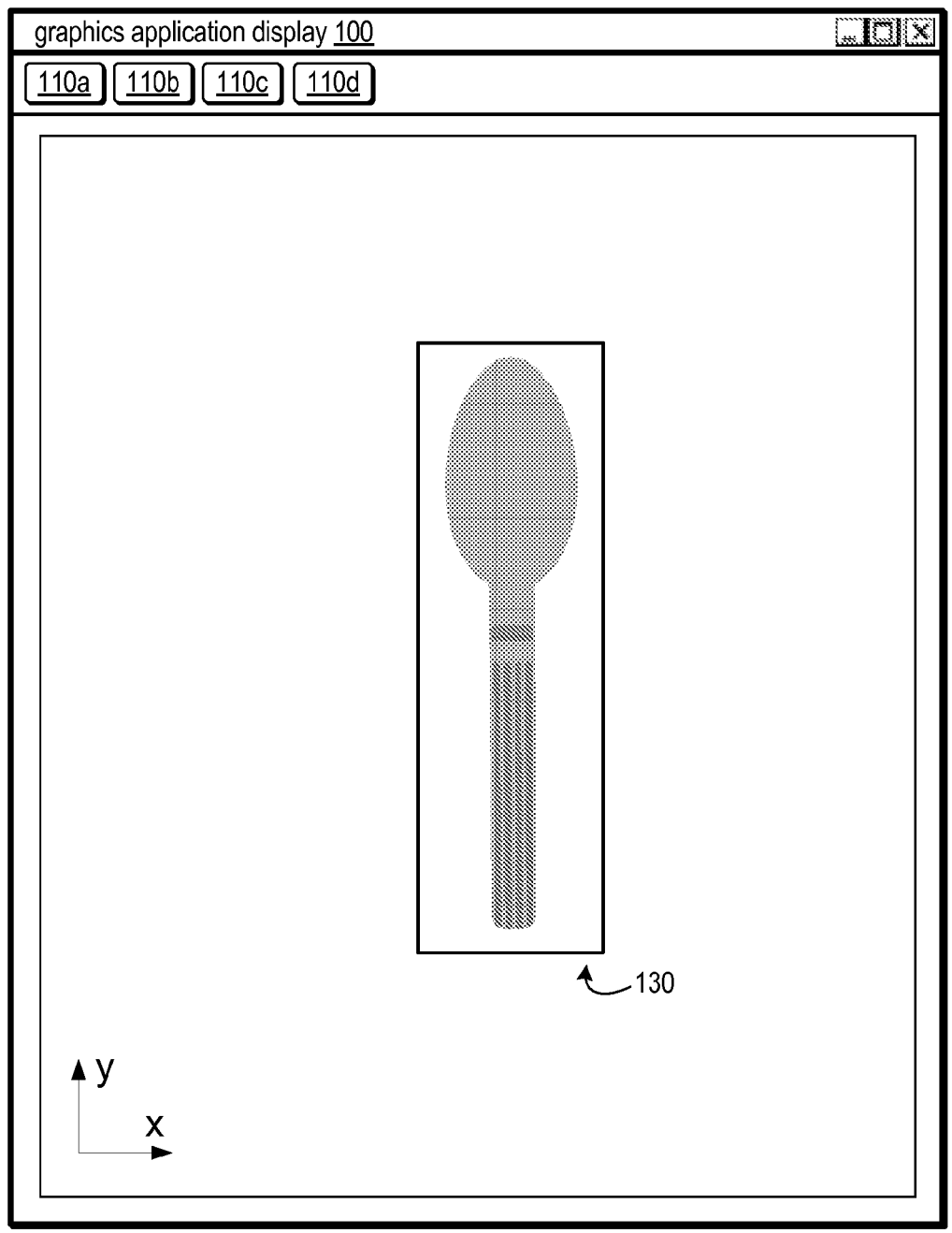

In one embodiment, such function may include a cropping function that may generate a cropped image by removing the portion of the image that is not selected by the rectangular selection area. FIG. 1D illustrates a cropped version of image 130. For instance, to create cropped image 130, the angular selection component and/or the graphics application may remove all elements of image 130 that were not selected by the rectangular selection area 150, as illustrated in FIG. 1C. In various embodiments, the angular selection component may be configured to automatically rotate the cropped image to generate a rotated cropped image, as illustrated in FIG. 1E. After rotation, two sides of the rotated cropped image 130 (e.g., the horizontal sides) may be parallel to the horizontal axis of the display, and the two other sides of the rotated cropped image (e.g., the vertical sides) may be parallel to the vertical axis of the display, as illustrated by FIG. 1E. In some embodiments, to rotate the image the angular selection component may determine an offset angle $\theta$ by which the un-rotated image is offset from an axis of the display (in various embodiments, either one of the axes may be utilized as a reference). After such angle is determined, the angular selection component and/or the graphics application described herein may automatically rotate the cropped image by the offset angle $\theta$ to generate the rotated cropped image, such as the rotated cropped image 130 of FIG. 1E. In various embodiments, the angular selection component may determine the direction (e.g., clockwise or counterclockwise) to rotate an image automatically based on input from a user or other entity. In some embodiments, the angular selection component may automatically determine to which direction the image should be rotated. For instance, in one embodiment, the angular selection component may automatically rotate the cropped image such that the side of the cropped image that corresponds to the second displacement (e.g., the side that corresponds to line segment a22-a02 of FIG. 1C) becomes the base of the rotated image. Note that in some embodiments, the cropping and rotating described above may include only one resampling operation to generate the rotated cropped image. For instance, in one example, performing the cropping of the image may include no resampling operation and performing the rotation of the cropped image may include no more than one resampling operation.

Figure 1F:
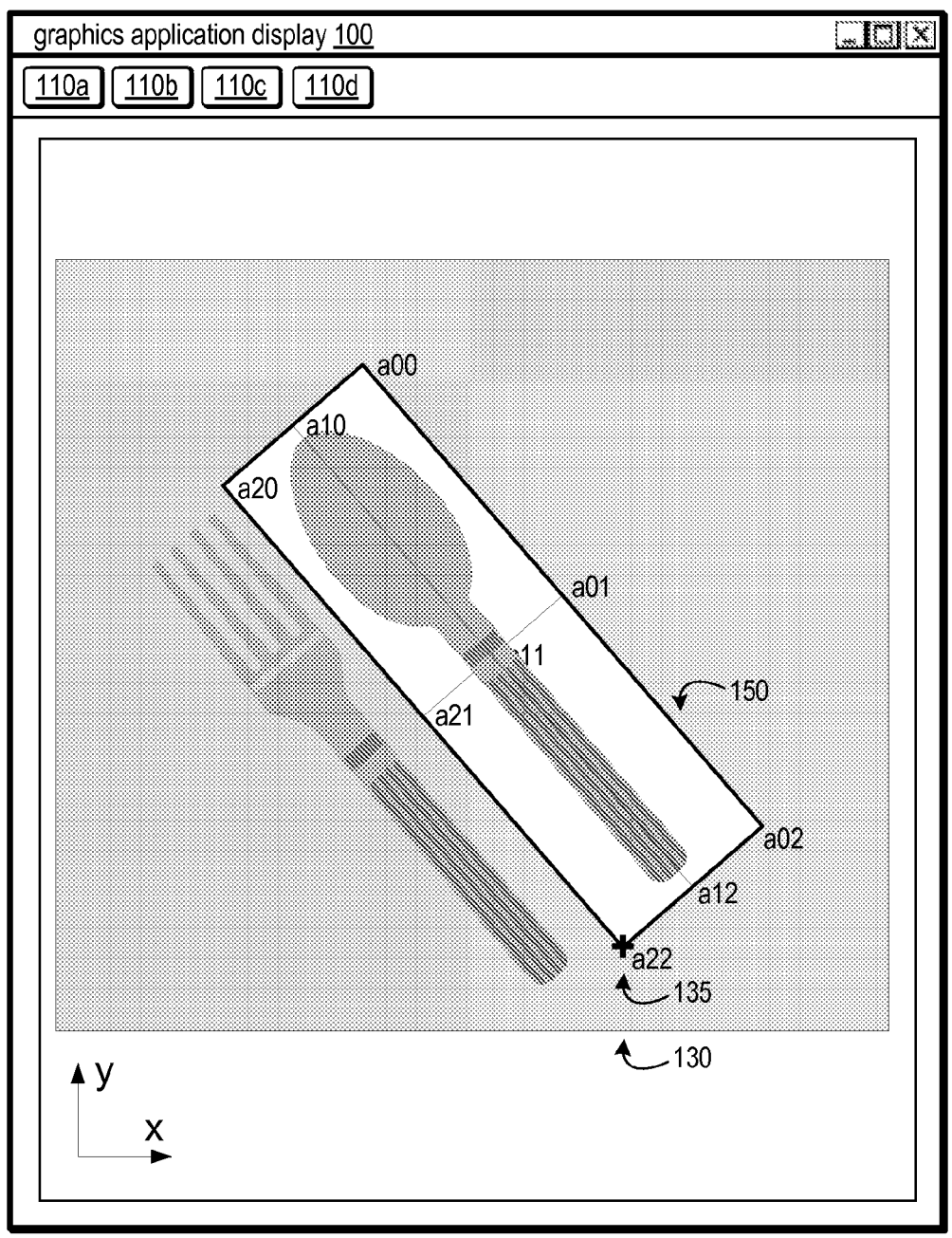

As described above with respect to the guides provided within the rectangular selection area (e.g., the perpendicular bisectors of the rectangular selection area) as well as guidelines 140, the angular selection component may be configured to generate display elements that facilitate the selection of the targeted image object. In various embodiments, generating one of such elements includes the angular selection component determining the portion of the image that is not currently selected by the rectangular selection area, and modifying (temporarily or permanently) that portion of the image. For instance, as illustrated in FIG. 1F, the angular selection component may be configured to darken the portion of the image that is not currently selected by the rectangular selection area and/or brighten the portion of the image that is currently selected by the rectangular selection area. Note that as rectangular selection area 150 is modified (e.g., in response to movement of control 135), the portion of the image that is not currently selected by the rectangular selection area (as well as the modification performed to that area) may change. In various cases, other types of modification may be performed on the portion of the image that is not currently selected by the rectangular selection area. In various embodiments any modification(s) performed on the portion of the image that is not currently selected by the rectangular selection area may only be temporary. For instance, after the particular rectangular selection area 150 has been confirmed, any modifications performed to the portion of the image that is not currently selected by the rectangular selection area may be removed or canceled. While one example of such modifications is provided above (e.g., darkening), any other type of image modification may be performed in various embodiments (e.g., color changes, brightness changes, contrast changes, hue changes, etc.).

Additional Angular Selection Examples

As illustrated in FIGS. 1A-1F, the generation of a rectangular selection area 150 that is oriented at an angle with respect to both axes of the display includes receiving various input indicating first and second displacements of a control (e.g., control 135). In the above described illustrated embodiments, the length of the first displacement defined (i.e., was equivalent to) the length of two sides of the rectangular selection area. Likewise, the length of the second displacement defined the length of the other two sides of the rectangular selection area. In those illustrated embodiments, the angular selection component may be configured to generate the rectangular selection area such that the area (or size) of the rectangular selection is equivalent to the product of the first displacement and the product of the second displacement (since the area of a rectangular is the product of the rectangle's width and the rectangle's length). Additionally, in the above described embodiments, the angular selection component is configured to generate the rectangular selection area such that the rectangular selection area shares one side (e.g., the side corresponding to the displacement a02 with respect to a00) with the first displacement. Likewise, the angular selection component is configured to generate the rectangular selection area such that the rectangular selection area shares another side (e.g., the side corresponding to the displacement a22 with respect to a02) with the second displacement. Note that aforementioned configurations are only examples of the manner according to which the angular selection component may generate a rectangular selection area. Other examples are described in more detail below; however, various embodiments are not limited to these examples.

Figure 2:
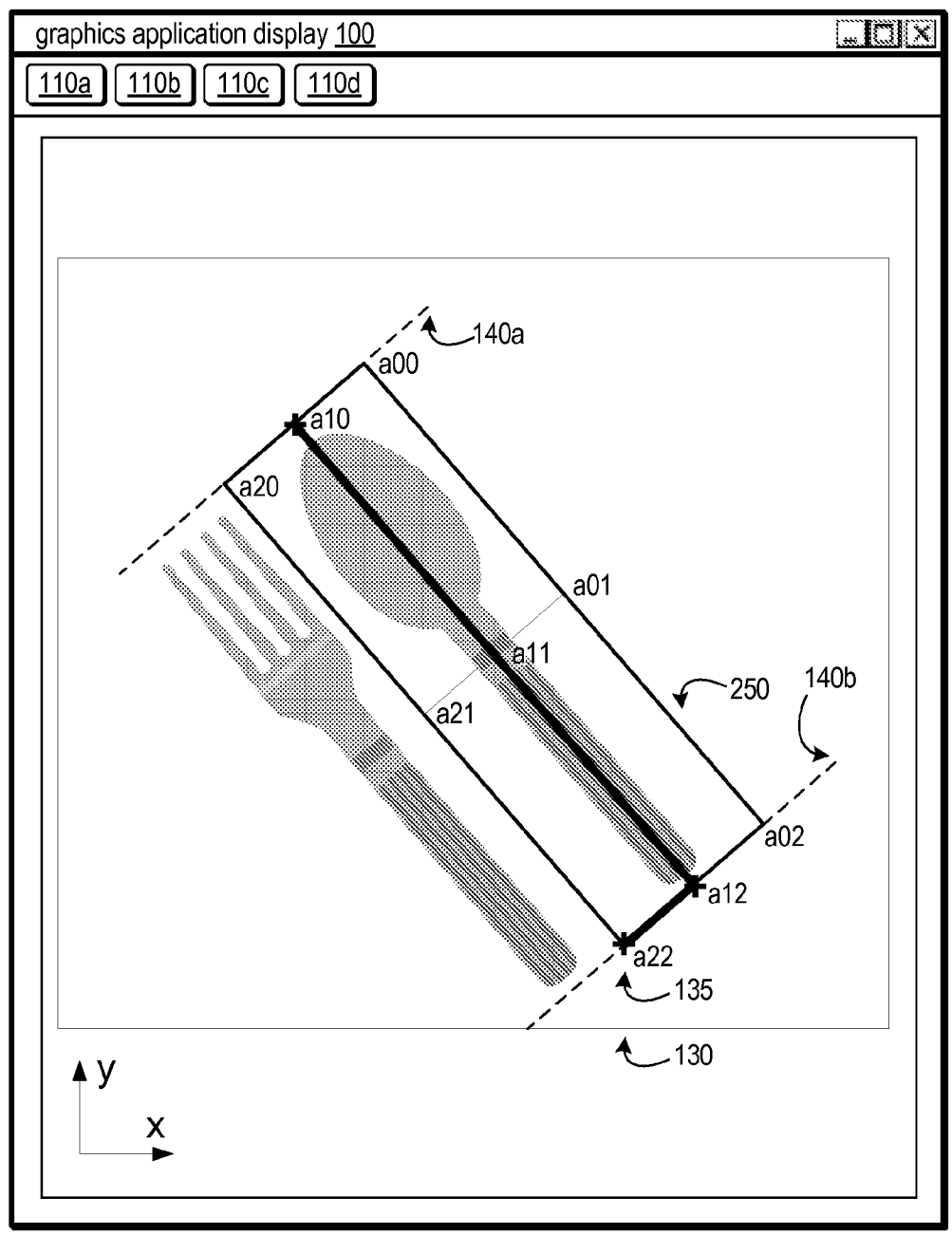
FIG. 2 illustrates an example display that may be generated by an angular selection component and/or graphics application, according to various embodiments.

In some embodiments, the angular selection component described herein may generate the rectangular selection area such that the rectangular selection area is bisected by the first displacement (e.g., the rectangular selection area exhibits symmetry across the first displacement). FIG. 2 illustrates a rectangular selection area generated by the angular selection component in such a manner. As illustrated by FIG. 2, a first displacement of control 135 (e.g., displacement of a12 with respect to a10) and a second displacement of control 135 (e.g., displacement of a22 with respect to a12) may be performed. Such displacements may be determined by the angular selection component via input provided to the graphics application. Based on the first and second displacements illustrated, the angular selection component may generate rectangular selection area 250 such that the selection area is bisected by the first displacement. For instance, in the illustrated embodiment, equal portions of the rectangular selection area reside on each side of the displacement of a12 with respect to location a10. In various embodiments, the width of each of such equal portions may be defined by the length of the second displacement (e.g., displacement of a35 with respect to location a12). Accordingly, in the illustrated embodiment, the angular selection component may generate a rectangular selection area 250 such that the area (or size) of the rectangular selection is equivalent to the product of the length of the first displacement and twice the length of the second displacement. In various embodiments, this configuration may facilitate the selection of image objects that have at least one line of symmetry.

Figure 3:
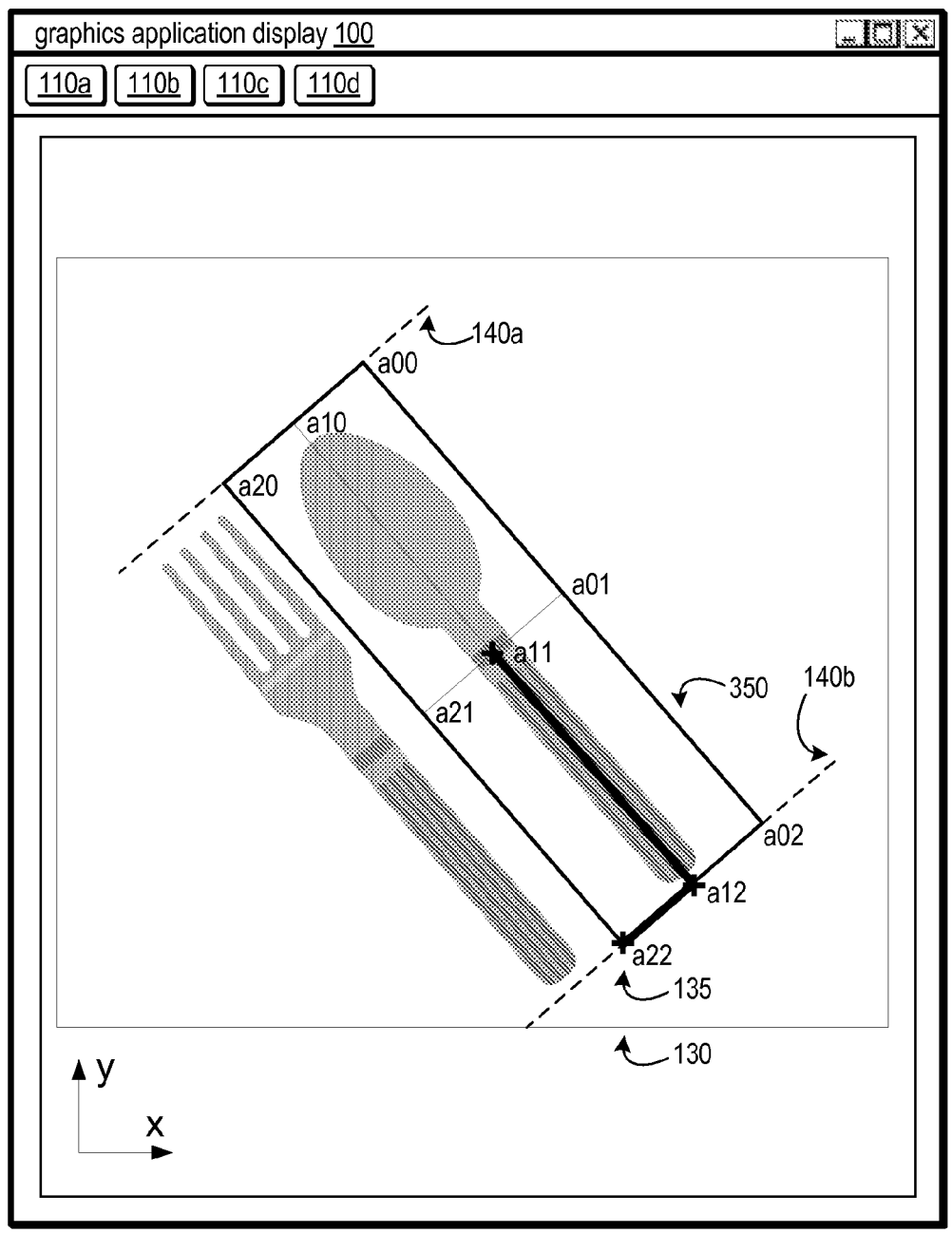
FIG. 3 illustrates an example display that may be generated by an angular selection component and/or graphics application, according to various embodiments.

In some embodiments, such as illustrated by FIG. 3, different variations of the above described rectangular selection area may be generated. For instance, as illustrated by rectangular selection area 350, the angular selection component may be configured to generate a rectangular selection area such that the size of the rectangular selection area is equivalent to the product of twice the length of the first displacement (e.g., displacement of a12 with respect to a11) and twice the length of the second displacement (e.g., displacement of a22 with respect to a12). In other embodiments, the angular selection component may be configured to generate a rectangular selection area such that the size of the rectangular selection area is equivalent to the product of twice the length of the first displacement and the length of the second displacement. In general, the angular selection component may be configured to generate a rectangular selection area such that the size of the rectangular selection is equivalent to the product of some factor of the length of the first displacement and some factor of the length of the second displacement.

Figure 4:
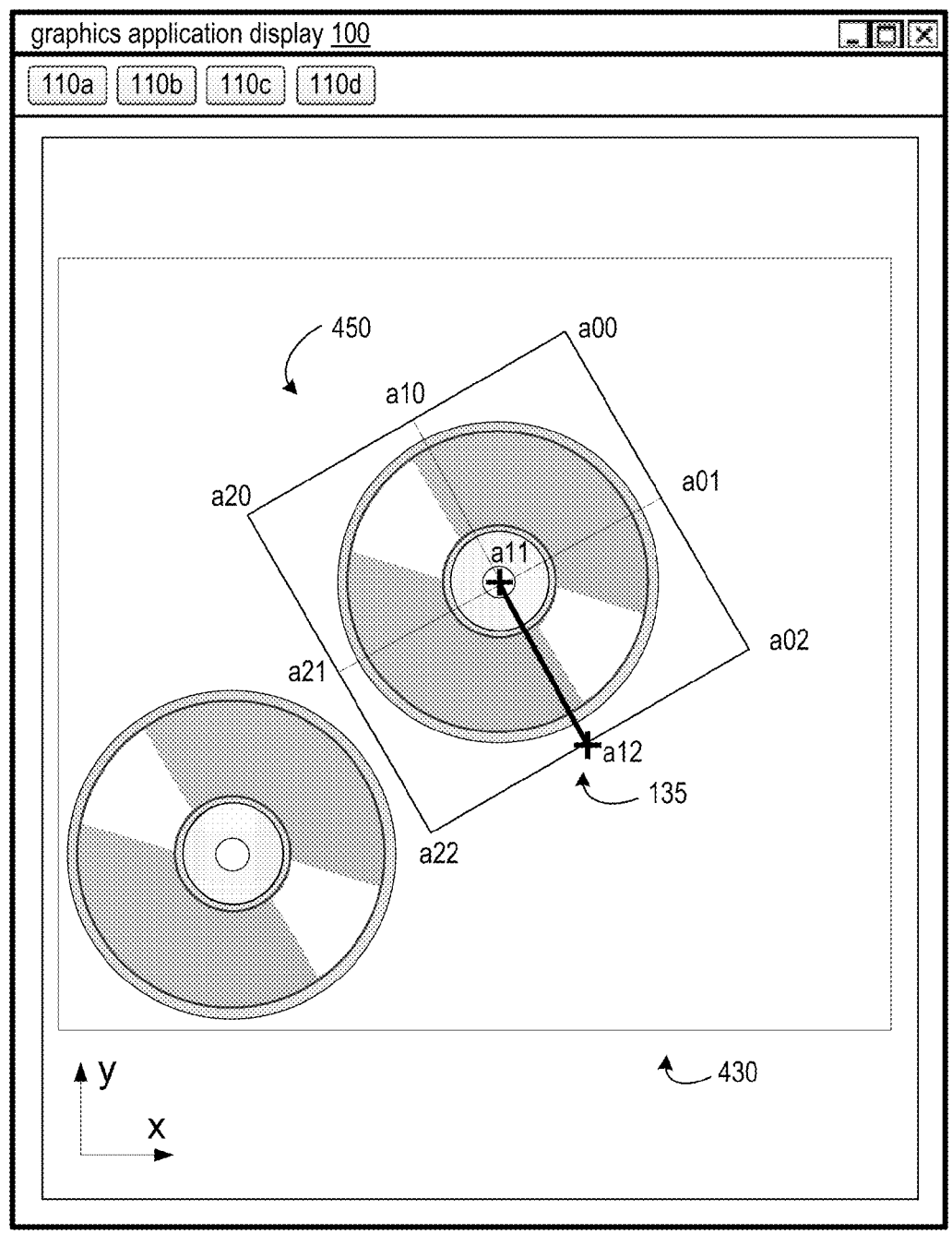
FIG. 4 illustrates an example display that may be generated by an angular selection component and/or graphics application, according to various embodiments.

In one particular embodiment, the angular selection component may be configured to generate a rectangular selection area in response to only one displacement of control 135. Such a configuration may in some embodiments facilitate the selection of image objects that have two or more lines of symmetry. For instance, FIG. 4 illustrates an example image 430, which illustrates two compact discs, which are circular (and thus have multiple lines of symmetry). In the illustrated example, the angular selection component may be responsive to a single displacement of control 135, as illustrated by the displacement of control 135 at location a12 with respect to location a11. Whereas the rectangular selection areas described above exhibit 2-way symmetry (e.g., symmetry across each of the two perpendicular bisectors of rectangular selection area 150), the angular selection component may be configured to generate a rectangular selection area that exhibits 4-way symmetry (e.g., a square selection area). For instance, rectangular selection area 450 (which in this case is both square and rectangular) exhibits symmetry across each of the two perpendicular bisectors (e.g., a line segment from a10-a12, and a line segment from a21 to a01) as well as the diagonals (e.g., a line segment from a20 to a02, and a line segment from a00 to a22). Note that in the illustrated embodiment, the size or area of the rectangular selection is equivalent to the product of twice the length of the displacement and twice the length of the displacement. Also note that, in the illustrated embodiment, two sides of the rectangular selection area (e.g., side a00-a02 and side a20-a22) area are parallel to the displacement, and two other sides (e.g., side a20-a00 and side a22-a02) of the rectangular selection area are perpendicular to the displacement.

Dynamic Preview of Cropped Images

Figure 5:
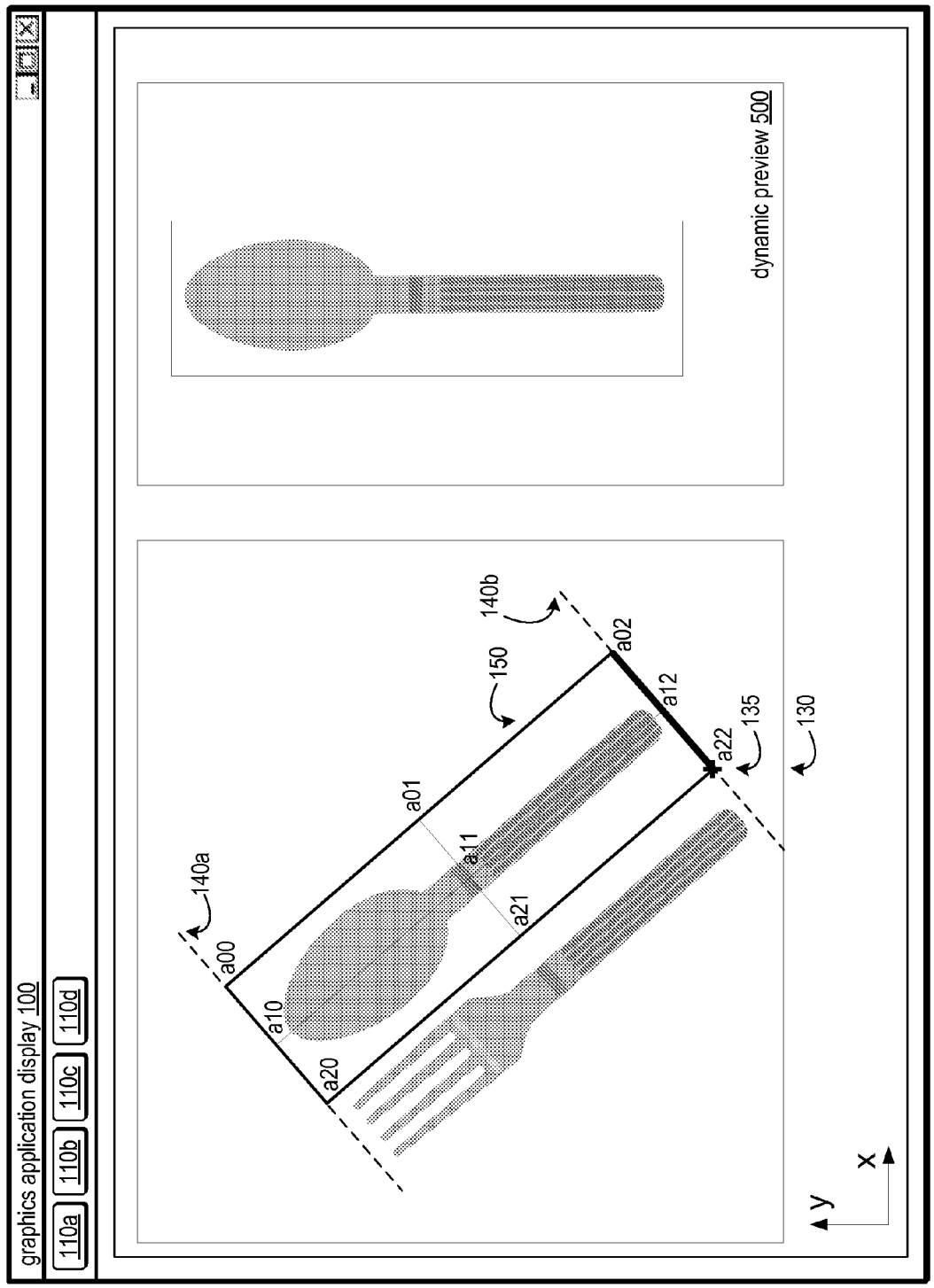
FIG. 5 illustrates an example display that may be generated by an angular selection component and/or graphics application, according to various embodiments.

FIG. 5 illustrates one example of a display that includes a preview image for the cropping function described above. As illustrated by FIG. 5, a rectangular selection area 150 may be generated according to the techniques described above. Additionally, as rectangular selection area 150 is generated (such as when control 135 is moved from location a02 to location a22), the angular selection component may be configured to generate at run time one or more images that indicate a preview 500 of the image that is to be cropped. For instance, before the disposition of rectangular selection area 150 is finalized and/or before the image is cropped accord to such selection area, the angular selection component may evaluate the current disposition of the rectangular selection area (since the selection area may change as control 135 is moved) and generate an image (e.g., preview 500) that indicates a representation of the cropped image were the cropping to be performed at the aforesaid current disposition of the rectangular selection area. While the rectangular selection area changes (e.g., as control 135 is moved above the display), the angular selection component may be configured to generate additional images that correspond to the rectangular selection area in real time (or near real time). Furthermore, the angular selection component may be configured to generate the preview images at any angle parallel to the horizontal or vertical axis of the display. In some embodiments, the angular selection component may determine such angle automatically or in response to input (e.g., input from a user or other entity).

Example Methods

Figure 6:
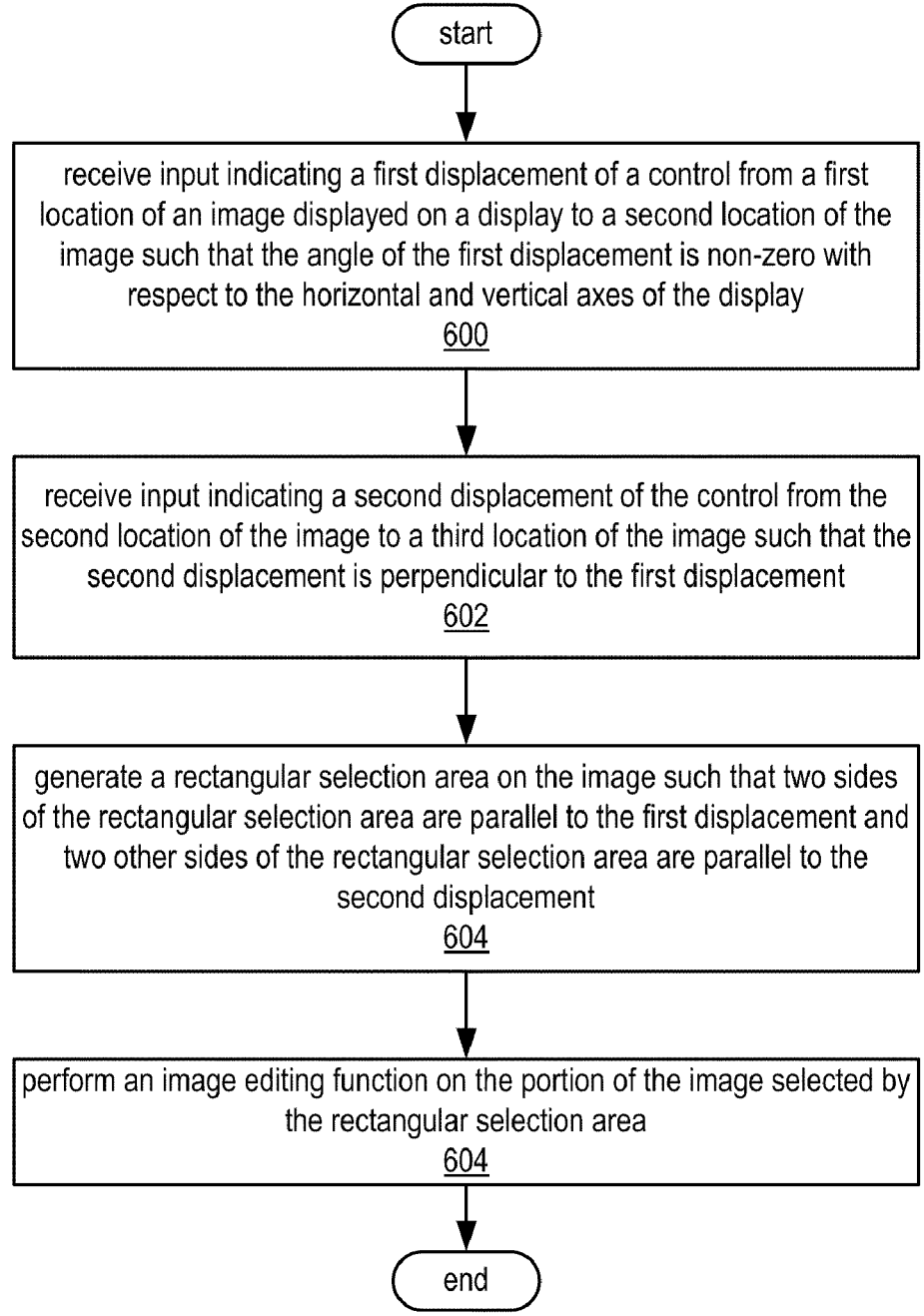
FIG. 6 illustrates a flowchart of an example method for generating a rectangular selection area, according to various embodiments.

The system and method for angular selection as described herein may include various methods for, among other things, generating rectangular selection areas that are oriented at angle that is non-zero with respect to the horizontal and vertical axes of the display. Various methods may also include performing one or more image editing functions on such a selection area of an image. One example of such methods is illustrated by the flowchart of FIG. 6. In various embodiments, the illustrated method may be performed by the angular selection component and/or the graphics application described herein. As illustrated by block 600, the method includes receiving input (e.g., user input) indicating a displacement of a control from a first location of an image displayed on a display to a second location of the image. The angle of the first displacement may be non-zero with respect to the horizontal and vertical axes of the display. For example, the movement of one type of control from a first location to a second location is described above with respect to FIG. 1B. Note that in various embodiments, the movement of the control may, but is not necessarily required to, travel along a straight line between the first and second locations. For instance, in some embodiments, such a control may travel (e.g., in response to user or other input) to various locations not present on the line between the first location and the second location prior to arriving at the second location. Accordingly, in various embodiments of the method, the displacement of the control and the movement of the control may not entirely coincide. Furthermore, in various embodiments of the method, the displacement of the control at the second location with respect to the first location is not parallel to the horizontal axis of the display (see e.g., FIG. 1B). Additionally, in various embodiments of the method, the displacement of the control at the second location with respect to the first location is not parallel to the vertical axis of the display (see e.g., FIG. 1B).

As illustrated by block 602, the method may include receiving input indicating a second displacement of the control from the second location of the image to a third location of the image; such second displacement may be perpendicular to the first displacement. In various embodiments of the method, this second displacement may (in conjunction with the first displacement) define the size of the rectangular selection area. FIG. 1C (described above) illustrates one example of such a displacement. In various embodiments, the method may include generating a rectangular selection area on the image such that two sides of the rectangular selection area are parallel to the first displacement and two other sides of the rectangular selection area are parallel to the second displacement. In various embodiments of the method, the area of the rectangular selection area may be equivalent to the product of the length of the first displacement and the length of the second displacement. However, in various embodiments of the method, other areas or sizes of rectangular selection areas may be generated based on the first displacement and the second displacement. Since in various embodiments the selection area to be generated by the method is to be rectangular and since adjacent sides of a rectangle are perpendicular to one another, the method may include forcing the second displacement to be perpendicular to the first displacement.

As illustrated by block 604, the method may include generating a rectangular selection area on the image such that two sides of the rectangular selection area are parallel to the first displacement and two other sides of the rectangular selection area are parallel to the second displacement. FIGS. 1C, 1D, 1F, 2, 3 illustrate numerous examples of such a rectangular selection area. In various embodiments, the method may include generating such selection area as a graphical element of a display. In some embodiments, the method may also (or alternatively) include generating a stored data structure that indicates which elements (e.g., image objects, pixels, etc.) are indicated as selected. As illustrated by block 606, the method may also include performing an image editing function on the portion of the image selected by the rectangular selection area. In some embodiments performing such a function may include cropping, adjusting contrast, adjusting brightness, adjusting saturation, adjusting hue, adjusting sharpness, blurring (e.g., a Gaussian blur), adjusting gamma, embossing, adjusting color or grayscale levels, auto leveling, smoothing, color shifting, despeckling, adjusting white balance, and/or various other image editing functions. In one embodiment, performing such a function may include performing a cropping function that may generate a cropped image by removing the portion of the image that is not selected by the rectangular selection area. FIG. 1 (described above) demonstrates various examples of such a cropping function.

Example System Configurations

Figure 7A:
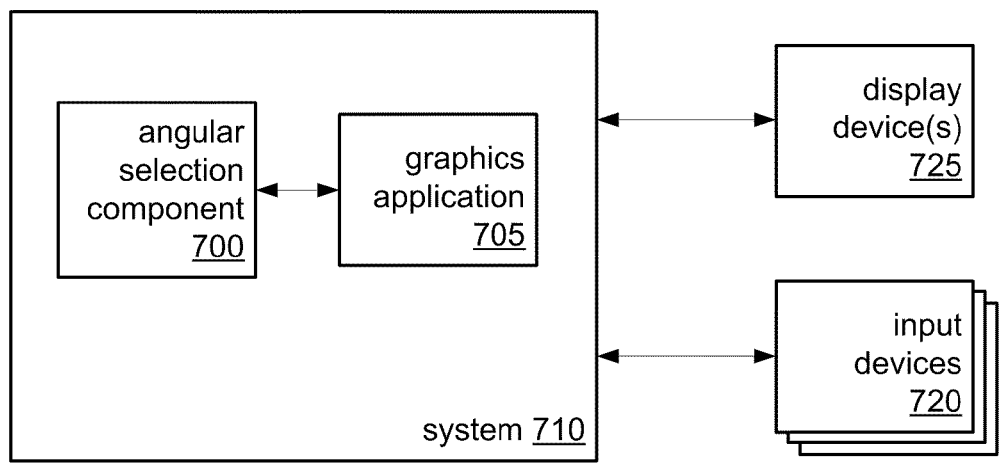
FIGS. 7A-B illustrate block diagrams of example system configurations for implementing an angular selection component and/or graphics application, according to various embodiments.
Figure 7B:
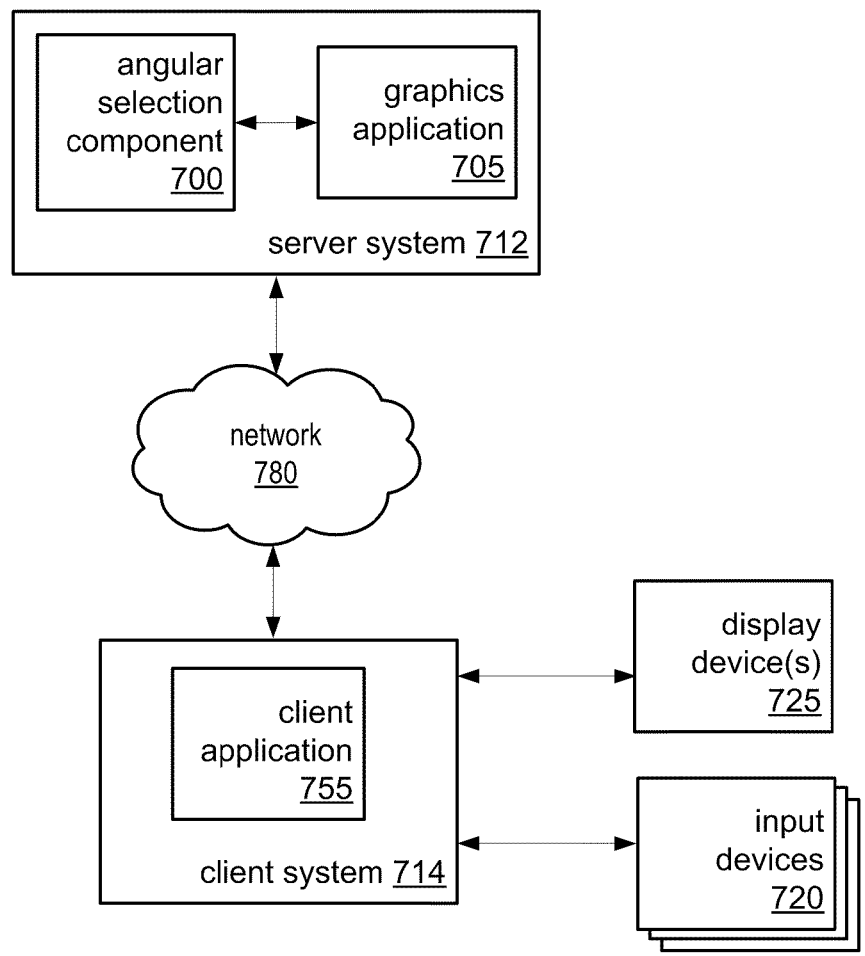

The angular selection component described above may be implemented in various systems including the computer systems of FIGS. 7A and 7B. In the illustrated embodiment, system 710 may be a computer system, such as a desktop or laptop computer, or some other device configured to execute program instructions stored in memory. System 710 may include a graphics application including application configured for, but not limited to, scientific, medical, design, painting, publishing, digital photography, video editing, games, animation, and/or other applications in which digital image generation, rendering and/or processing may be performed. Specific examples of graphics applications 705 in which embodiments may be implemented include, but are not limited to, Adobe® Fireworks® and Adobe® Photoshop®. The illustrated angular selection component 700 may be implemented as or in a tool, module, library function, plug-in, application extension, stand-alone application, etc.

System 710 may receive input from one or more input devices 710, which may include, but are not limited to, keypads, keyboards, a mouse, trackballs, track pads, touch screens, or any other device configured to receive input from a user and provide input to a computing system, such as system 700. Display devices 725 may include but are not limited to monitors (e.g., Cathode Ray Tube, Liquid Crystal Displays, touch screens, etc.), projectors, or any other device configured to output data from system 710. In various embodiments, the input received from input devices 720 may include indications of specific locations of an image (e.g., the beginning and/or end of a particular displacement). In some embodiments, such input may include one or more indications of what type of rectangular selection area is to be generated (e.g., two-way or four-way symmetrical selection areas, as described above). In some cases, such input may include one or more commands for utilizing graphics application 705 or the various image editing functions described herein.

FIG. 7B illustrates another example system configuration. In the illustrated embodiment, client system 714 may access the graphics application 705 and/or the angular selection component 700 through one or more computer networks such as network 780. Network 780 may include one or more Local Area Networks (LANs) (e.g., corporate or Ethernet networks), Wide Area Networks (WANs), another type of network configured to transmit data, or some combination thereof. In one embodiment, client system 714 may utilize client application 755 (e.g., a network-based browser, such as a web browser) to access graphics application 712 and/or angular selection component 700, which may be hosted by a remote computer system (e.g., server system 712).

Example System

Figure 8:
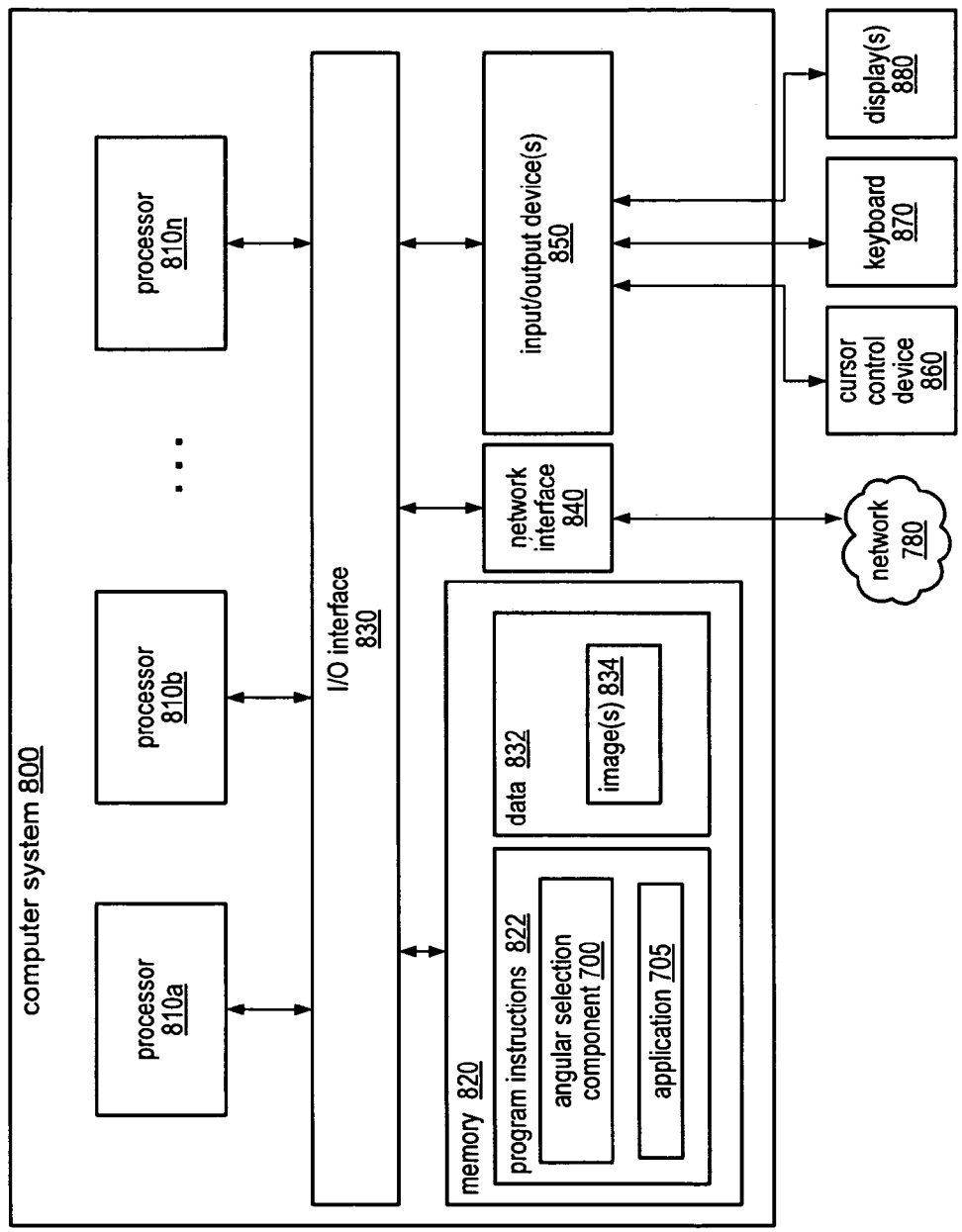
FIG. 8 illustrates a computing system suitable for implementing various elements of a system and method for angular image selection, according to various embodiments.

Various embodiments of a system and method for angular image selection, as described herein, may be executed on one or more computer systems, which may interact with various other devices. One such computer system is computer system 800 illustrated by FIG. 8, which may in various embodiments implement systems 710, 712, and/or 714 described above. Computer system 800 may be capable of implementing an angular selection component, such as angular selection component 700, and one or more applications, such graphics application 705. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some embodiments, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, data 832 may include various images, such as images 130 and 430 described above. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing an angular selection component and an application, such as the angular selection component and graphics application described above, are shown stored within system memory 820 as angular selection component 700 and graphics application 705, respectively. In other embodiments, program instructions and/or data may be received, sent or stored upon different types of computer-accessible media or on similar media separate from system memory 820 or computer system 800. Generally speaking, a computer-accessible medium may include storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network (e.g., network 780) and/or a wireless link, such as may be implemented via network interface 840.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 780), such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 7, memory 820 may include program instructions 822 configured to implement an angular selection component, such as angular selection component 700, and an application, such as graphics application 705. In one embodiment, angular selection component 700 may implement the methods described above, such as the methods illustrated by FIG. 6. In other embodiments, different elements and data may be included.

Those skilled in the art will appreciate that computer system 800 is merely illustrative and is not intended to limit the scope of the present invention. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure. Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of the invention as defined in the claims that follow.

What is claimed is:

1. A computer-implemented method, comprising:
   receiving input indicating a first displacement of a control from a first location of an image displayed on a display to a second location of the image, wherein the angle of the first displacement is non-zero with respect to horizontal and vertical axes of the display;
   receiving input indicating a second displacement of the control from said second location of the image to a third location of the image, wherein the second displacement is perpendicular to said first displacement;
   generating a rectangular selection area on the image such that two sides of the rectangular selection area are parallel to said first displacement and two other sides of the rectangular selection area are parallel to said second displacement; and
   performing an image editing function on the portion of the image selected by the rectangular selection area.

2. The computer-implemented method of claim 1, wherein performing said image editing function comprises performing a cropping function to generate a cropped image by removing the portion of the image not selected by said rectangular selection area.

3. The computer-implemented method of claim 2, further comprising rotating the cropped image to generate a rotated cropped image, wherein two sides of the rotated cropped image are parallel to the vertical axis of the display and two other sides of the rotated cropped image are parallel to the horizontal axis of the display.

4. The computer-implemented method of claim 3, wherein performing said cropping function and said rotating comprises performing only one resampling to generate the rotated cropped image.

5. The computer-implemented method of claim 2, wherein the method further comprises, while said control is moved from said second location of the image to said third location of the image and prior to performing the cropping function, generating multiple preview images, each preview image rotated such that two sides of the preview image are parallel to the vertical axis of the display and two other sides of the preview image are parallel to the horizontal axis of the display; wherein each preview image is an image indicating a result of the cropping function based on a respective location of the control as the control is moved from said second location to said third location.

6. The computer-implemented method of claim 1, wherein generating said rectangular selection area comprises generating said selection area according to a particular size, wherein said size is dependent upon a length of the first displacement and a length of the second displacement.

7. The computer-implemented method of claim 6, wherein said size is equivalent to the product of the length of the first displacement and the length of the second displacement.

8. The computer-implemented method of claim 6, wherein said size is equivalent to the product of the length of the first displacement and twice the length of the second displacement.

9. The computer-implemented method of claim 6, wherein said size is equivalent to the product of twice the length of the first displacement and twice the length of the second displacement.

10. The computer-implemented method of claim 6, wherein said size is equivalent to the product of twice the length of the first displacement and the length of the second displacement.

11. The computer-implemented method of claim 1, wherein the method comprises generating in real time, one or more guidelines perpendicular to said first displacement, wherein each guideline is parallel to a given side of said rectangular selection area.

12. A system, comprising:
   a processor; and
   a memory coupled to the processor, wherein the memory comprises program instructions executable by the processor to:

receive input indicating a first displacement of a control from a first location of an image displayed on a display to a second location of the image, wherein the angle of the first displacement is non-zero with respect to horizontal and vertical axes of the display;

receive input indicating a second displacement of the control from said second location of the image to a third location of the image, wherein the second displacement is perpendicular to said first displacement;

generate a rectangular selection area on the image such that two sides of the rectangular selection area are parallel to said first displacement and two other sides of the rectangular selection area are parallel to said second displacement; and perform an image editing function on the portion of the image selected by the rectangular selection area.

13. The system of claim 12, wherein to perform the image editing function the program instructions are configured to perform a cropping function to generate a cropped image by removing the portion of the image not selected by said rectangular selection area.

14. The system of claim 13, wherein the program instructions are configured to rotate the cropped image to generate a rotated cropped image, wherein two sides of the rotated cropped image are parallel to the vertical axis of the display and two other sides of the rotated cropped image are parallel to the horizontal axis of the display.

15. The system of claim 14, wherein to perform said cropping function and said rotating the program instructions are configured to perform only one resampling to generate the rotated cropped image.

16. The system of claim 13, wherein the program instructions are configured to, while said control is moved from said second location of the image to said third location of the image and prior to performing the cropping function, generate multiple preview images, each preview image rotated such that two sides of the preview image are parallel to the vertical axis of the display and two other sides of the preview image are parallel to the horizontal axis of the display; wherein each preview image is an image indicating a result of the cropping function based on a respective location of the control as the control is moved from said second location to said third location.

17. The system of claim 12, wherein to generate said rectangular selection area the program instructions are configured to generate said selection area according to a particular size, wherein said size is dependent upon a length of the first displacement and a length of the second displacement.

18. The system of claim 17, wherein said size is equivalent to the product of the length of the first displacement and the length of the second displacement.

19. The system of claim 17, wherein said size is equivalent to the product of the length of the first displacement and twice the length of the second displacement.

20. The system of claim 17, wherein said size is equivalent to the product of twice the length of the first displacement and twice the length of the second displacement.

21. The system of claim 17, wherein said size is equivalent to the product of twice the length of the first displacement and the length of the second displacement.

22. The system of claim 12, wherein the program instructions are configured to generate in real time, one or more guidelines perpendicular to said first displacement, wherein each guideline is parallel to a given side of said rectangular selection area.

23. A computer-readable storage medium, storing program instructions computer-executable to:

receive input indicating a first displacement of a control from a first location of an image displayed on a display to a second location of the image, wherein the angle of the first displacement is non-zero with respect to horizontal and vertical axes of the display;

receive input indicating a second displacement of the control from said second location of the image to a third location of the image, wherein the second displacement is perpendicular to said first displacement;

generate a rectangular selection area on the image such that two sides of the rectangular selection area are parallel to said first displacement and two other sides of the rectangular selection area are parallel to said second displacement; and perform an image editing function on the portion of the image selected by the rectangular selection area.

24. The medium of claim 23, wherein to perform the image editing function the program instructions are configured to perform a cropping function to generate a cropped image by removing the portion of the image not selected by said rectangular selection area.

25. The medium of claim 23, wherein the program instructions are configured to rotate the cropped image to generate a rotated cropped image, wherein two sides of the rotated cropped image are parallel to the vertical axis of the display and two other sides of the rotated cropped image are parallel to the horizontal axis of the display.

26. The medium of claim 25, wherein to perform said cropping function and said rotating the program instructions are configured to perform only one resampling to generate the rotated cropped image.

27. The medium of claim 24, wherein the program instructions are configured to, while said control is moved from said second location of the image to said third location of the image and prior to performing the cropping function, generate multiple preview images, each preview image rotated such that two sides of the preview image are parallel to the vertical axis of the display and two other sides of the preview image are parallel to the horizontal axis of the display; wherein each preview image is an image indicating a result of the cropping function based on a respective location of the control as the control is moved from said second location to said third location.

28. The medium of claim 23, wherein to generate said rectangular selection area the program instructions are configured to generate said selection area according to a particular size, wherein said size is dependent upon a length of the first displacement and a length of the second displacement.

29. The medium of claim 28, wherein said size is equivalent to the product of the length of the first displacement and the length of the second displacement.

30. The medium of claim 28, wherein said size is equivalent to the product of the length of the first displacement and twice the length of the second displacement.

31. The medium of claim 28, wherein said size is equivalent to the product of twice the length of the first displacement and twice the length of the second displacement.

32. The medium of claim 28, wherein said size is equivalent to the product of twice the length of the first displacement and the length of the second displacement.

33. The medium of claim 23, wherein the program instructions are configured to generate in real time, one or more guidelines perpendicular to said first displacement, wherein each guideline is parallel to a given side of said rectangular selection area.

34. A system, comprising:
a processor; and a memory coupled to the processor, wherein the memory comprises program instructions executable by the processor to:

receive input indicating a displacement of a control from a first location of an image displayed on a display to a second location of the image, wherein the angle of the displacement is non-zero with respect to horizontal and vertical axes of the display;

generate a square selection area on the image such that two sides of the square selection area are parallel to said displacement and two other sides of the square selection area are perpendicular to said displacement; and perform an image editing function on the portion of the image selected by the square selection area.

35. The system of claim 34, wherein to perform the image editing function the program instructions are configured to perform a cropping function to generate a cropped image by removing the portion of the image not selected by said square selection area.

36. The system of claim 35, wherein the program instructions are configured to rotate the cropped image to generate a rotated cropped image, wherein two sides of the rotated cropped image are parallel to the vertical axis of the display and two other sides of the rotated cropped image are parallel to the horizontal axis of the display.

37. A computer-implemented method, comprising:

executing instructions on a specific apparatus so that binary digital electronic signals representing input indicating a first displacement are received, wherein the first displacement is a displacement of a control from a first location of an image displayed on a display to a second location of the image, wherein the angle of the first displacement is non-zero with respect to horizontal and vertical axes of the display;

executing instructions on said specific apparatus so that binary digital electronic signals representing input indicating a second displacement are received, wherein the second displacement is a displacement of the control from said second location of the image to a third location of the image, wherein the second displacement is perpendicular to said first displacement;

executing instructions on said specific apparatus so that binary digital electronic signals representing a rectangular selection area on the image are generated such that two sides of the rectangular selection area are parallel to said first displacement and two other sides of the rectangular selection area are parallel to said second displacement;

executing instructions on said specific apparatus to perform an image editing function on the portion of the image selected by the rectangular selection area; and storing a result of the image editing function in a memory location of said specific apparatus.

* * * * *